United States Patent
McKenzie

[11] 3,760,885
[45] Sept. 25, 1973

[54] RIDGE FORMER

[76] Inventor: Ross B. McKenzie, 8115 Rio Linda Blvd., Elveria, Calif.

[22] Filed: Mar. 15, 1971

[21] Appl. No.: 124,049

Related U.S. Application Data

[63] Continuation-in-part of Ser. No. 823,759, May 12, 1969, abandoned.

[52] U.S. Cl................. 172/574, 172/184, 172/176, 172/686 X, 172/701
[51] Int. Cl............................................. A01b 5/06
[58] Field of Search.................... 172/145, 148–151, 172/176–178, 184, 181, 187, 535, 547, 550, 566, 558, 567, 574, 600, 628, 641, 642, 652, 686, 690, 643, 701, 786

[56] References Cited
UNITED STATES PATENTS

| | | | |
|---|---|---|---|
| 2,739,396 | 3/1956 | Frenzel | 172/686 |
| 2,643,600 | 6/1953 | Rinderknecht | 172/701 |
| 2,455,566 | 12/1948 | Deakins | 172/184 |
| 3,032,124 | 5/1962 | Herring et al. | 172/642 |
| 3,327,786 | 6/1967 | Meyer | 172/484 |
| 3,454,104 | 7/1969 | Fuchs | 172/176 |
| 2,603,049 | 7/1952 | Mullin | 172/535 |
| 2,141,693 | 12/1938 | Murphy | 172/786 |
| 1,663,813 | 3/1928 | Paul | 172/574 |
| 1,248,953 | 12/1917 | Treadwell | 172/566 |
| 3,045,765 | 7/1962 | Cox et al. | 172/566 |
| R15,213 | 10/1921 | Parrish | 172/574 |
| 1,785,676 | 12/1930 | De Yone | 172/574 |
| 307,809 | 11/1884 | Skillings | 172/574 |
| 1,740,874 | 12/1929 | Polhemus et al. | 172/600 |

FOREIGN PATENTS OR APPLICATIONS

| | | | |
|---|---|---|---|
| 615,541 | 5/1933 | Germany | 172/574 |
| 611,786 | 10/1960 | Italy | 172/248 |

Primary Examiner—Robert E. Pulfrey
Assistant Examiner—Eugene H. Eickholt
Attorney—Christie, Parker & Hale

[57] ABSTRACT

A ridge forming machine includes a frame adapted to move over the ground and a pair of opposed scrapers mounted on the frame to engage the ground and scrape dirt on the ground toward each other to form a ridge. The scrapers can be moved toward and away from each other to vary the area over which the dirt is scraped. In one form of the invention the frame comprises a front section pivotally interconnected with a rear frame section having a pair of rearwardly diverging beams. A separate disc is rotatably mounted on each beam, and the beams are pivotal relative to the front frame section to move the discs up and down relative to the ground.

15 Claims, 17 Drawing Figures

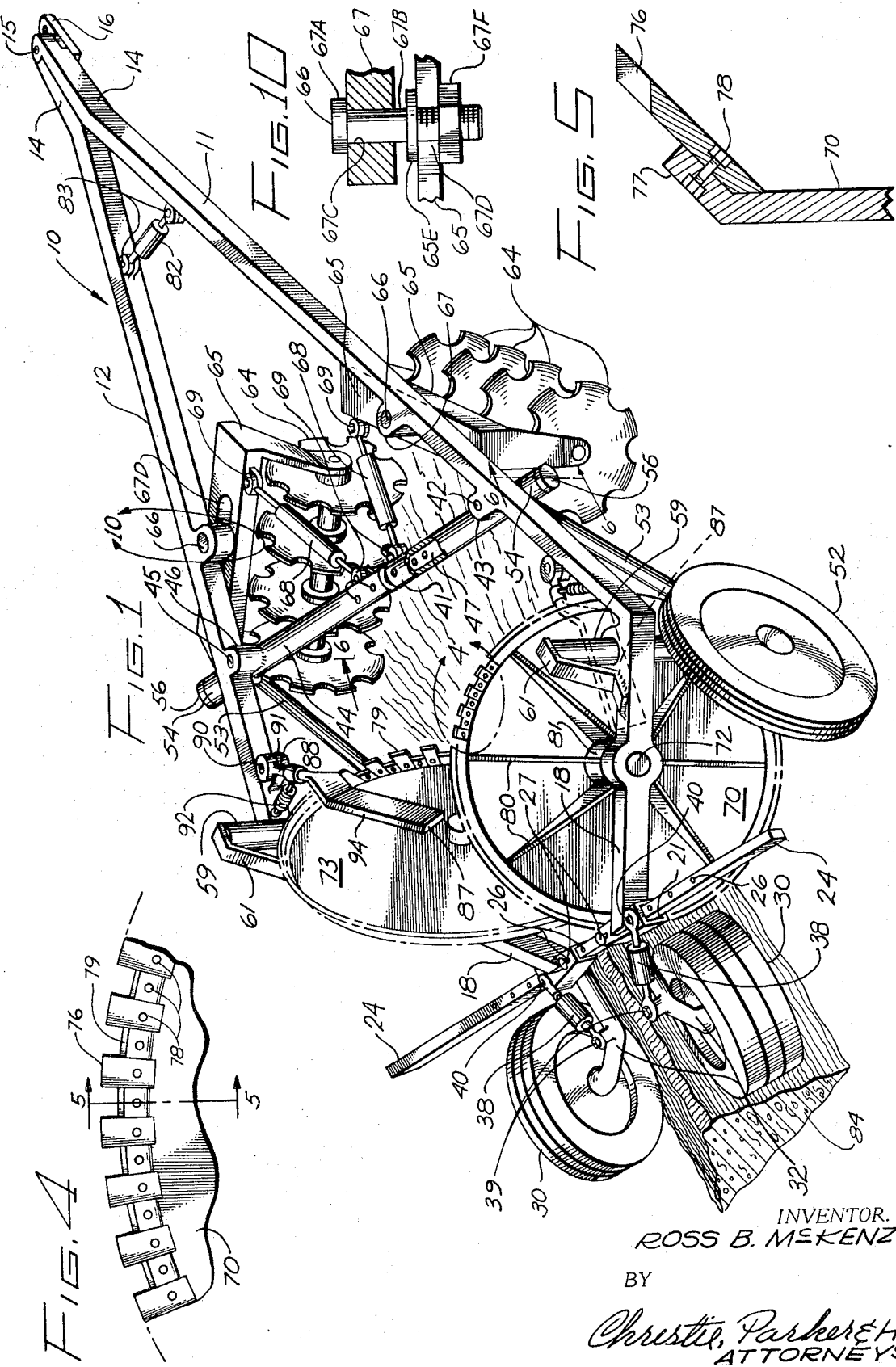

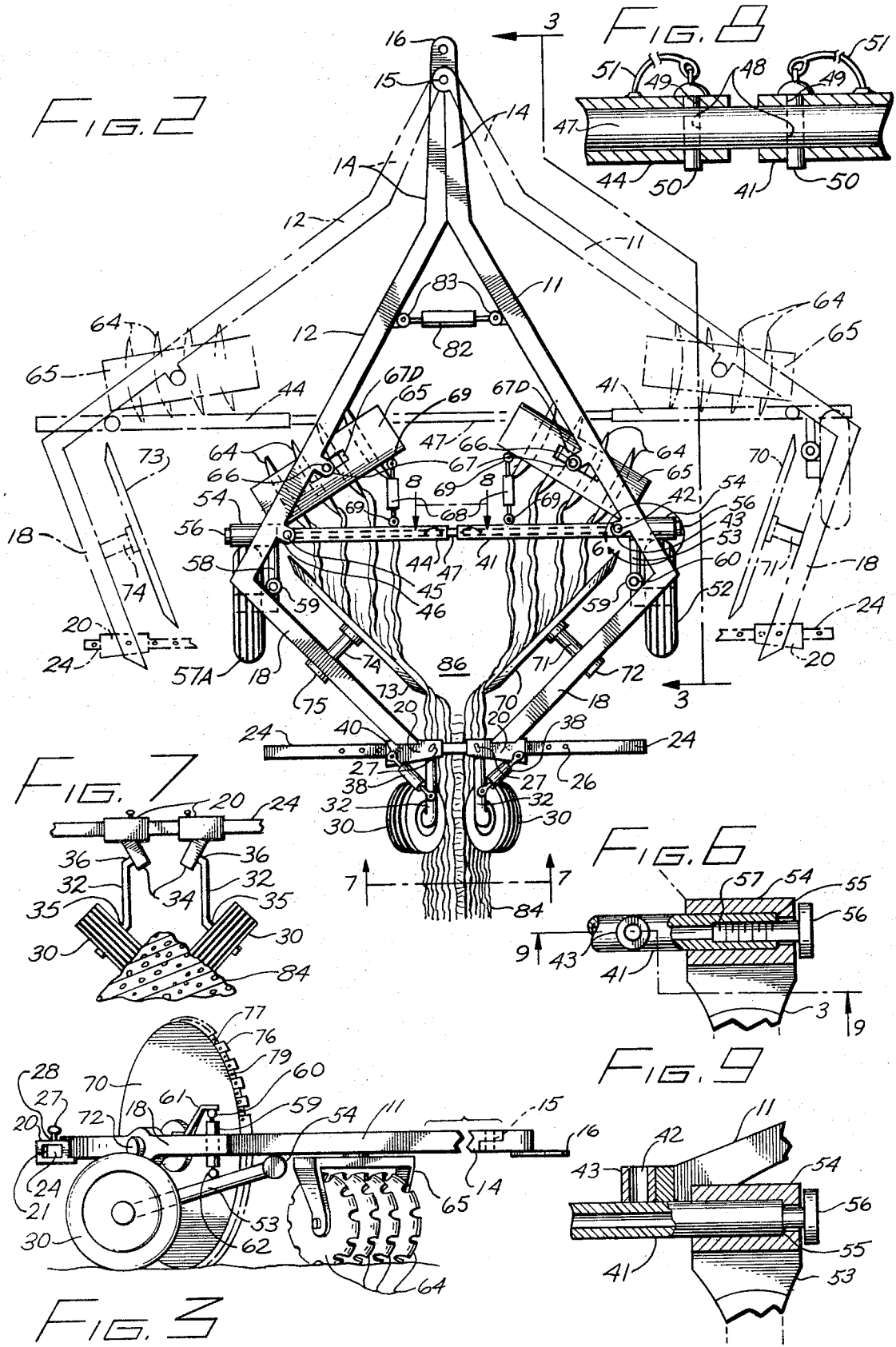

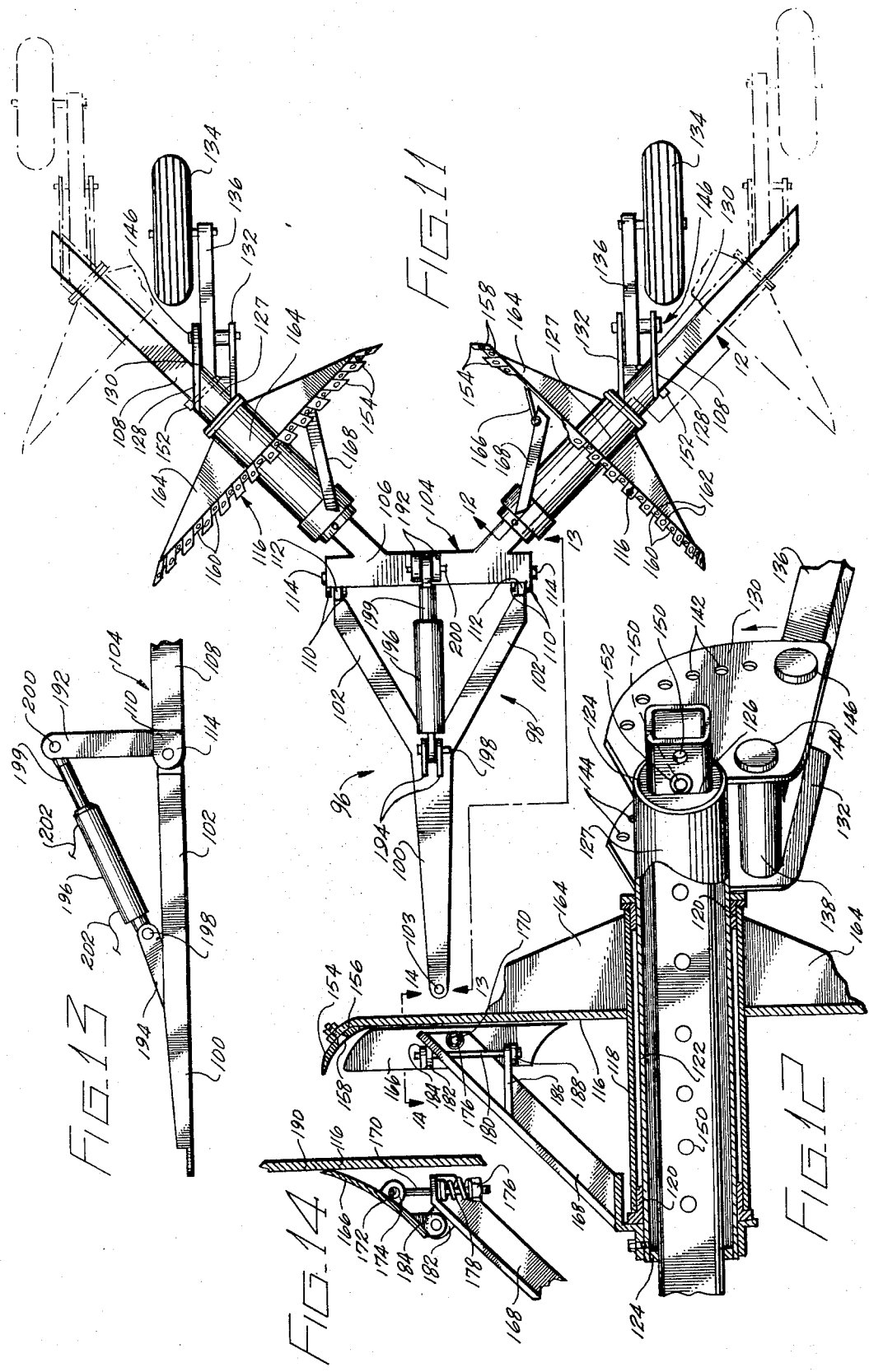

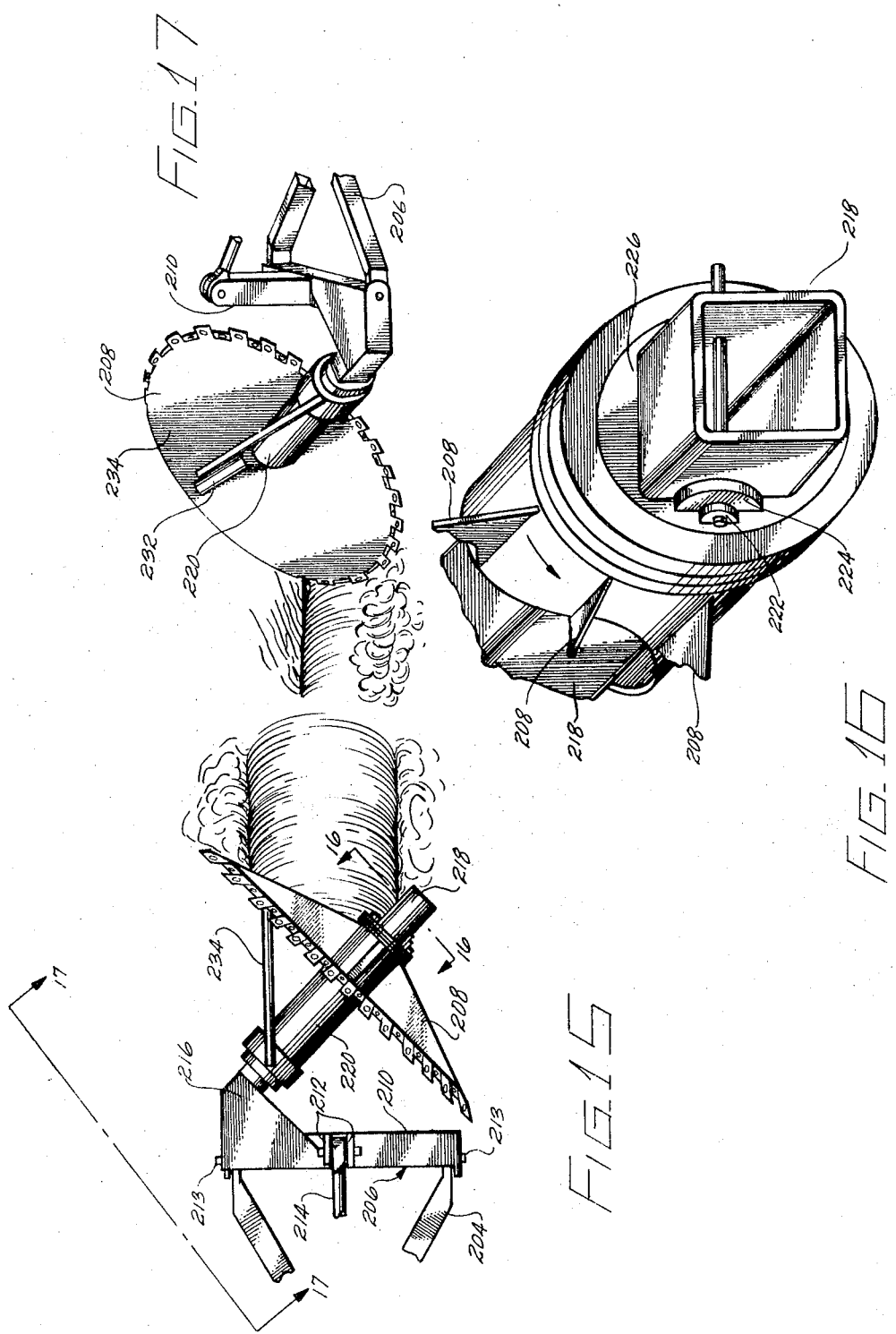

RIDGE FORMER

CROSS-REFERENCE TO RELATED APPLICATION

This application is a continuation-in-part of my co-pending U.S. Pat. application Ser. No. 823,759, filed May 12, 1969, now abandoned.

BACKGROUND OF THE INVENTION

This invention relates to earth moving equipment such as that used to form ridges or levees in rice farming. The ridges or levees are formed in a gridwork to define generally square-shaped paddies which are filled with water during the rice growing season. When rice is not grown, it is often desirable to level the ridges so the land on which they had been formed can be used to raise other crops. It is also desirable to level the ridges and form fresh ridges at the beginning of each rice planting season to discourage the growth of weeds on the ridges and to discourage habitation by pests such as muskrats which dig holes through old ridges covered with weeds. Muskrats do not damage freshly formed ridges because such ridges are not covered by weeds and therefore do not provide shelter for the animals.

One disadvantage of levelling the ridges after each rice crop is that the formation of new ridges is sometimes hampered by the weather. For example, the rice planting season in the northern hemisphere usually begins in April and May. If heavy rains precede the planting period, the earth is often so damp that it is difficult to scrape it into the required ridges to form the rice paddies. If presently available dirt scraping equipment is used in earth that is too wet, the dirt is turned up in large slabs, and is unsuitable for forming ridges.

SUMMARY OF THE INVENTION

This invention provides a ridge forming machine which can be used to scrape earth which is wetter than that which can now be handled by conventional ridge formers. The machine makes a first pass over the ground with scrapers set to scrape dirt from a wider area and at a shallower depth than with the prior art equipment. A second pass is made to move the first scraped dirt and additional freshly scraped dirt into a ridge.

In one form of the invention, a pair of opposed scrapers are mounted on a frame which is adapted to be moved over the ground so the scrapers scrape dirt toward each other. Means are provided for moving the scrapers toward and away from each other so that they can scrape dirt from areas of different widths, depending on the distance between them.

In another form of the invention, wheels are mounted on the frame to limit the penetration of the scrapers into the ground, and thereby avoid "slabbing" wet earth. Preferably, the machine includes both the wheel and the adjustable scrapers to avoid excessive penetration of wet ground. Even when the ground is not objectionaly wet, the machine of this invention builds a better ridge by scraping dirt from a wider area to avoid building a ridge in a relatively deep trench.

In a preferred form of the invention, the frame comprises a pair of pivotally interconnected frame sections. A pair of scrapers is mounted on one frame section, and the frame sections are pivoted relative to each other to move the scrapers up and down relative to the ground to adjust their penetration into the ground. A single lifting device, such as a hydraulic ram connected between the frame sections, can raise or lower the scrapers with respect to the ground.

BRIEF DESCRIPTION OF THE DRAWINGS

These and other aspects of the invention will be more fully understood from the following detailed description and the accompanying drawings in which:

FIG. 1 is a perspective view of the presently preferred embodiment of the ridge forming machine of this invention;

FIG. 2 is a fragmentary plan view of the ridge forming machine of FIG. 1 with the scrapers set relatively closely together as shown in solid line, and in a phantom line position which shows how the frame can be spread to vary the distance between the scrapers. The phantom line position is an extreme one for clarity of the drawing, and ordinarily the machine is not operated with the scrapers disposed so far apart;

FIG. 3 is a view taken on line 3—3 of FIG. 2;

FIG. 4 is a view taken in the area of the circle 4 of FIG. 1;

FIG. 5 is a view taken on line 5—5 of FIG. 4;

FIG. 6 is a view taken in the area of the circle 6 of FIG. 2;

FIG. 7 is a view taken on line 7—7 of FIG. 2;

FIG. 8 is a view taken on line 8—8 of FIG. 2;

FIG. 9 is a view taken on line 9—9 of FIG. 6;

FIG. 10 is a view taken partly in section in the area of circle 10 of FIG. 1;

FIG. 11 is a plan view of an alternate ridge forming machine;

FIG. 12 is a view taken on line 12—12 of FIG. 11;

FIG. 13 is a view taken on line 13—13 of FIG. 11;

FIG. 14 is a view taken on line 14—14 of FIG. 12, the view being inverted for clarity;

FIG. 15 is a plan view of a ditching machine;

FIG. 16 is a view taken on line 16—16 of FIG. 15; and

FIG. 17 is a view taken on line 17—17 of FIG. 15.

DETAILED DESCRIPTION OF THE PREFERRED EMBODIMENTS

Referring to FIG. 1, a frame 10 includes a horizontal, rearwardly and outwardly extending right beam 11, and an identical left beam 12. The forward end of each beam is secured to a separate horizontal elongated tongue 14. The tongues are secured together at their forward ends by a hinge pin 15 so the beams can pivot about an upright axis toward and away from each other as shown in FIG. 2. A conventional hitch 16 is secured to the lower end of the hinge pin so the frame can be towed by a tractor (not shown), or other suitable vehicle.

Each beam extends rearwardly and outwardly to form a V-shaped portion and a central part of the frame. Inwardly and rearwardly extending sections 18 at the rear end of each beam give the frame a diamond shape when viewed from above as shown in FIG. 2. A separate shell 20 with a transverse opening 21 extending entirely through it is secured to the rear end of each section 18 of the frame. An elongated rear slide bar 24 with longitudinally spaced, vertical holes 26 is disposed through the shells. A separate vertical pin 27 is disposed through a respective vertical hole 28 in each of the shells and fits into an aligned hole 26 in the rear slide bar so that the frame is locked in the position shown in FIG. 2. The frame can be opened by removing pins 27, spreading the beams to the desired spacing, and can be locked in that position by reinserting pins 27 into appropriate holes 26.

A separate packing wheel 30 is mounted on the lower end of respective strut 32 secured at its upper end to pivot in a block 34 (FIG. 7) secured to the underside of a respective shell 20. Each packing wheel rotates about an upwardly and inwardly extending transverse axis 35, and each strut pivots about an upwardly and inwardly extending pivot shaft 36 in its respective block 34. Each wheel is raised and lowered by a separate respective compression turnbuckle 38 (FIGS. 1 and 2) connected at its lower end by a ball joint 39 to the lower portion of a respective strut and at its upper end by a ball joint 40 to a respective shell. Hydraulic lines for operating the cylinder to adjust the position of the packer wheels are not shown for simplicity. A transverse, elongated, horizontal, forward right sleeve 41 is secured adjacent its right end by a vertical pivot pin 42 to rotate in a socket 43 secured to the inner side of the rear portion of right beam 11. An identical left front sleeve 44 is secured by a vertical pivot pin 45 to rotate in a socket 46 secured to the inside of the rear portion of left beam 12. The front sleeves are collinear and open-ended.

An elongated, forward, cylindrical slide bar 47 makes a close slip fit within the front sleeves and extends from one side of the frame to the other. The forward slide bar has vertical holes 48 (FIG. 8) which can be aligned with vertical holes 49 in each of the front sleeves 41 and 44. A separate respective pin 50 is secured to one end of a respective short cable 51, the other end of which is secured to a respective sleeve adjacent its inner end. Thus, when the pins 27 in the shells 20 are removed, and the pins 50 in the sleeves are removed, the frame can be spread from the position shown in FIG. 2 toward that shown in phantom line, although the machine is not ordinarily operated with the frame spread as widely as indicated in FIG. 2 in phantom line.

A right depth wheel 52 is mounted to rotate about a transverse horizontal axis at the rear end of an upwardly and forwardly extending right wheel arm 53 secured at its upper end to a sleeve cap 54 which makes a slip fit over the outer end of the right sleeve 41. An inwardly extending annular flange 55 on the sleeve cap abuts the outer end of the right sleeve 41 and is held in place by bolt 56 threaded into the outer end of the sleeve and bottomed on a shoulder 57 so the sleeve cap is free to rotate on the end of the sleeve and permit the wheel arm to be pivoted about an axis collinear with that of the sleeve.

A left depth wheel 57A is mounted in a similar fashion on a left wheel arm 58 to the left end of the left sleeve.

The wheel arms are moved up and down by respective hydraulic cylinders 59 secured at their respective upper ends by a ball joint socket 60 to brackets 61 on a respective section 18 of the frame. The lower end of each wheel arm hydraulic cylinder 59 is secured by a ball joint socket 62 to an intermediate portion of its respective wheel arm so the wheel can be moved up and down with respect to the frame by hydraulic pressure applied to the cylinders through conventional lines (not shown). The cylinders are controlled independently so that either side of the frame can be made higher or lower than the other.

A first or right set of four conventional harrowing discs 64 are mounted in a yoke 65 secured under the right beam by an upright pin 66 journalled in socket 67 on the inside of the right beam. A similar left set of harrowing discs 64 are mounted on the left beam to pivot about a vertical pin 66. Each pin 66 has a head 67A which rests on socket 67. The pin also includes a downwardly extending shank 67B which makes a slip fit in a vertical bore 67C extending entirely through the socket 67. The lower end of the shank is of a reduced threaded diameter, and fits through a transverse slot 67D in the top of the yoke. A stop washer 67E on the shank of the pin abuts the shoulder where it is stepped down to a reduced diameter. The stop washer 67E rests on the upper surface of the yoke. A locking nut 67F is threaded on to the lower portion of the pin shank to bear against the underside of the yoke and lock the yoke in the desired transverse position. By loosening nut 67F, the yoke can be slipped inwardly or outwardly within the limits of the slot 67D.

Each set of harrowing discs is held at the desired angle with respect to the frame by separate respective compression turnbuckles 68 which are secured at their forward ends by ball socket joints 69 to the inward and rear edge of each yoke of the harrowing discs, and at their rear ends by ball and socket joints 69 to the inner ends of the right and left sleeves. As shown best in FIG. 1, the periphery of each disc is serrated to improve its cutting power and penetration into the ground.

A right circular gathering disc 70 is mounted to rotate about a horizontal forwardly and inwardly extending shaft 71 journalled in a thrust bearing 72 mounted on the central portion of the right section 18 of the frame. A similar circular gathering disc 73 is mounted to rotate on a horizontal inwardly and forwardly extending shaft 74 journalled in a thrust bearing 75 mounted in the intermediate portion of the left section 18 of the frame. As shown in FIGS. 1, 3, 4 and 5, the periphery of each gathering disc carries radially spaced long teeth 76 which improve the cutting power and penetration of the gathering discs into the dirt scraped inwardly by the harrowing discs. As shown best in FIG. 5, the periphery of each gathering disc includes a forwardly extending annular flange 77 on which the teeth 76 are mounted by bolts 78. Short teeth 79 are mounted between adjacent teeth 76 so that the forward surfaces of the teeth are substantially flush.

The rear face of each gathering disc is reinforced by tapering and radially extending webs 80 secured at their inner ends to hub 81 on the rear face of each gathering disc.

A transverse compression turnbuckle 82 is secured by ball sockets 83 between the forward portions of beams 11 and 12 so the turnbuckle can be used to adjust the angle between the beams.

Using the ridge forming machine just described, the beams 11 and 12 are set at the desired spacing by adjusting the position of the shells on the rear slide bar and the position of the sleeves on the forward slide shaft and locking them in position with the respective pins 27 and 50. For example, in a relatively damp field where the earth would tend to "slab" instead of pulverize readily, the beams are set so that the harrowing discs are farther apart than shown in FIG. 2, but not at the extreme position shown in phantom line. The desired angle of the harrowing discs with respect to the direction in which the frame is to be pulled, is determined by the length of turnbuckles 68. If the field is fairly damp, the frame is elevated with respect to the depth wheels by applying pressure to the hydraulic cylinders 59 to lift the harrowing discs to the desired position and avoid excessive penetration into the ground. The packer wheels are lifted out of contact with any dirt scraped by the harrowing discs by actuation of cylinders 38.

The hitch is connected to the towbar of a tractor or other suitable towing vehicle, and pulled in the direction in which a ridge 84 is to be formed. Ordinarily, the ridge is about 3 feet wide and about 2 feet high, although this can vary from one area to another and with the preference of the farmer.

As the ridge forming machine is pulled, the harrowing discs turn and cut into the earth so that dirt is scraped, or urged to move inwardly. If the field is wet, there is relatively little penetration of the ground by the discs to avoid turning up large, unmanageable slabs which do not form a satisfactory ridge or levee. The earth turned up by the harrowing discs is moved by the gathering discs toward the centerline of the equipment. However, since the beams are spread at an angle greater than that shown in FIG. 2, the final ridge is not formed at this stage. Instead, a second pass is made along the line on which ridge 84 is to be formed. Ordinarily, if the ground is relatively wet, the second pass is not made for a day or two to give the turned earth a chance to dry, and to facilitate its pulverization and formation into the ridge.

Before making the second pass with the equipment, the beams are adjusted to the position shown in FIG. 2, and the equipment is pulled in the same direction as previously described. The harrowing discs now cut and turn the earth which was previously collected by the gathering discs, and if necessary penetrate the ground to turn up additional earth. The earth moved by the harrowing discs is collected by the gathering discs and forced through a space 86 between the rear edges of the gathering discs. The packer wheels are set to the desired height by adjusting fluid pressure in the cylinders 38 so the packer wheels ride on the dirt forced through the gathering discs and pack the dirt into a firm, water-impervious levee. If the ridge tends to be lower than that desired, the packer wheels tend to settle, and cause the gathering discs to penetrate deeper and collect more dirt. This builds up the height of the ridge to that called for by the setting of the packer wheels with the cylinders 38. Thus, the height of the ridge is automatically controlled by the packer wheels.

As shown best in FIG. 1, a separate respective horizontal cleaning blade 87 is mounted adjacent the forward portion of the forward face of each gathering disc. Each blade extends forwardly and outwardly and is connected by a blade arm 88 to an upright pin 90 mounted to pivot in a socket 91 secured to the inside face of a respective beam. A tension spring 92 secured at one end to the blade arm and at the other end to the inside face of the beam to the rear of the pivot pin 90 urges the cleaning blade against the forward face of its respective gathering disc. The upper edge of each cleaning blade is bevelled upwardly and rearwardly to present a knife edge 94 which scrapes against the forward face of the gathering disc as the gathering discs rotate when the equipment is pulled over the ground. The cleaning blades prevent the accumulation of mud on the gathering discs and avoid clogging of an opening 86 between the adjacent rear portions of the gathering discs.

Any dirt which tends to cling to the forward faces of the gathering discs is scraped off by the cleaning blades and dropped into the relatively open area between the forward portions of the gathering discs. This avoids a tendency to clog the narrower space 86 between the rear portions of the discs.

The machine can also be used to knock down ridges or levees after they have served their purpose for a particular planting season. In so using the machine, one side of the frame is elevated more than the other. The harrowing discs on the lower side are pulled along a ridge or levee to knock it down, but the other set of harrowing discs are held up out of contact with the ground.

Other forms of the embodiment shown in FIGS. 1 through 10 can be used without departing from the scope of the invention. For example, the harrowing discs can be moved toward and away from each other by adjusting their positions longitudinally along their respective beams, instead of pivoting the beams with respect to each other. For example, each beam can have several sockets to receive the upright pivot pins 66 which carry the yokes for the harrowing discs.

FIGS. 11 through 14 show an alternative ridge forming machine 96 which includes a frame 98 having a front frame section 100 in the form of a yoke with a pair of rearwardly diverging yoke arms 102. The front end of frame section 100 has an opening 103 extending through it for connection to a hitch (not shown) so frame 98 can be towed by a tractor (not shown) or other suitable vehicle.

Frame 98 also includes a rear frame section 104 having a transverse beam 106 at its front and a pair of rearwardly diverging, transversely square, elongated support beams 108 integral with transverse beam 106 and extending rearwardly and outwardly from transverse beam 106. A pair of parallel, laterally spaced apart mounting brackets 110 extending downwardly from each end of transverse beam 106. Each yoke arm 102 has a separate rearwardly projecting finger 112 at its end fitted between a respective pair of the mounting brackets 110. A separate pivot pin 114 extends through a respective one of the fingers and its corresponding pair of mounting brackets to pivotally connect front frame section 100 to rear frame section 104. Thus, front frame section 100 may be held in a fixed position and rear frame section 104 may swing up and down about a horizontal transverse axis through transverse beam 106.

A separate rearwardly converging circular disc 116 is rotatably mounted on each support beam 108. As shown best in FIG. 12, each disc 116 is rigidly secured, such as by welding, to an elongated, transversely circular, tubular shaft 118 which extends through the center of the disc. Each shaft 118 is journalled in a respective annular bushing 120 mounted on each end of an elongated, transversely circular, tubular slide bar 122. A circular mounting plate 124 is rigidly secured, such as by welding, to the interior wall surface at each end of slide bar 122. Each mounting plate 124 has a square opening 126 which loosely fits around the square support beam 108. Thus, each disc 116 and slide bar 122 slide relative to their respective support beams 108.

Each slide bar 122 has a rearwardly and outwardly extending end portion 127 projecting outwardly from the rear end of shaft 118. Each rear end portion 127 has a bevelled rear wall surface 128 (see FIG. 11) which lies at an oblique angle relative to its respective support beam 108. As shown best in FIG. 11, each angular rear wall surface 128 lies in a plane parallel to the longitudinal centerline of the ridge forming machine, i.e., in a plane parallel to the direction in which the machine is moved over the ground when in use.

A separate rearwardly extending first mounting plate 130 is rigidly secured to the rear end of end portion 127 of each slide bar 122. A separate rearwardly extending second mounting plate 132 is rigidly secured to end portion 127 of each slide bar 122 at a point spaced from its corresponding first mounting plate. Each second mounting plate is parallel to its corresponding first mounting plate, so each pair of first and second mounting plates lies in a plane parallel to the longitudinal centerline of the ridge forming machine.

A separate depth wheel 134 is mounted on each side of the frame to rotate about a transverse horizontal axis at the rear end of a respective upwardly and forwardly extending wheel strut 136 which is rigidly secured at its upper end to a respective sleeve 138 (see FIG. 12) fitted between each pair of first and second mounting plates. A separate pivot pin 140 extends through a forward portion of each mounting plate 130 and 132 and through sleeve 138 to pivotally secure each wheel strut 136 between a respective pair of mounting plates. Thus, each wheel strut is free to pivot up and down between its corresponding pair of mounting plates, as shown by the arrow in FIG. 12. Each wheel strut is perpendicular to its respective sleeve 138, so each strut extends rearwardly along an axis parallel to the longitudinal axis of the frame.

Each first mounting plate 130 has a row of spaced apart holes 142 which line on a fixed radius centered at pivot pin 140. Similarly, each second mounting plate 132 has a row of spaced apart holes 144 which lie on a fixed radius centered at pivot pin 140. Each hole 142 has a common horizontal axis with a respective one of the holes 144. Each wheel strut 136 has a hole (not shown) spaced rearwardly from pivot pin 140, the hole being positioned to register with each corresponding pair of holes 142 and 144 as the wheel strut is pivoted up and down between mounting plates 130 and 132. A separate locking bolt 146 extends through a corresponding pair of the holes 142 and 144 and through the registering wheel strut hole to fasten each wheel strut in a given fixed position relative to the frame. Each bolt 146 extends through a separate tubular spacer 148 mounted between each wheel strut and its corresponding first mounting plate.

In use, the elevation of each wheel strut 136 may be adjusted relative to its respective support beam 108 by removing bolt 146 to free the wheel strut and permit it to move to a given position between a pair of corresponding holes 142 and 144. Bolt 146 is then replaced and tightened to fasten the wheel strut in a fixed position between mounting plates 130 and 132.

Each slide bar 122 is slidably mounted on its corresponding support beam 108, and in use the slide bar may be moved forward and rearward along the support beam to move each disc 116 and depth wheel 134 as a unit to a desired position. A row of longitudinally spaced apart internally threaded holes 150 extend through the outer side wall of each support beam 108. Each hole 150 is laterally aligned with a corresponding internally threaded hole (not shown) extending through the inner side wall on the opposite side of the beam.

In use, the rear end of slide bar 122 is moved adjacent to one of the holes 150 to locate the disc and depth wheel unit at a desired position on the support beam. A bolt 152 then is threaded through the hole 150 which is aligned with the end of the slide bar and through the corresponding hole on the other side of the support beam. The head portion of bolt 152 bears against the rear wall of mounting plate 124 and acts as a stop to prevent movement of the slide bar relative to the support beam. FIG. 11 shows each disc and wheel unit in a forward position on each support beam 108. Each unit may be slidably moved rearwardly along the support beam to the position shown in phantom lines in FIG. 11 so as to adjust the spacing between the discs.

The periphery of each disc 116 carries radially spaced long teeth 154 which improve the cutting power and penetration of the discs into the ground when the frame is moved over the ground. The periphery of each disc includes a forwardly extending annular flange 156 (see FIG. 12) on which the teeth are mounted by bolts 158. Radially spaced short teeth 160 are mounted between adjacent long teeth by bolts 162. The forward surfaces of the long teeth are substantially flush with each other, and the forward surfaces of the short teeth are substantially flush with each other. Teeth 154 and 160 are removable independently from the disc so each tooth may be replaced if it becomes dull or damaged during use. Each disc 116 is reinforced by a plurality of radially extending triangular webs 164 which are rigidly secured, such as by welding, to the rear face of the disc. The discs are relatively costly items, and the removable teeth prolong the useful life of the discs when compared with discs having teeth which are an integral part of the disc.

A separate elongated, arcuately curved cleaning blade 166 is mounted adjacent to the forward portion of the forward face of each disc 116. Each blade is connected to the free end of an elongated blade arm 168 which is rigidly secured to the slide bar 122 on which the cleaning blade's disc 116 is mounted. Each cleaning blade is hinged to the free end of blade arm 168 so as to move relative to the blade arm. As shown best in FIGS. 12 and 14, an upright elongated bolt 170 extends through the free end of blade arm 168 and is pivotally secured at its upper end to the central portion of cleaning blade 166 by a pivot pin 172 extending between a pair of brackets 174 rigidly secured to the rear face of blade 166. A nut 176 is threaded on the lower end of bolt 170 and engages a spring 178 which is urged into engagement with the lower end of blade arm 168. Blade arm 168 is pivotally connected to the lower portion of the rear face of cleaning blade 166 by a pivot pin 180, one end of which pivotally interconnects a first mounting bracket 182 at the free end of the blade arm with a cooperating first mounting bracket 184 on the lower portion of the cleaning blade. The other end of pin 180 pivotally interconnects a second mounting bracket 186 spaced from the free end of the blade arm with a cooperating second mounting bracket 188 secured to the lower portion of the rear face of the cleaning blade at a point spaced from first mounting bracket 184. The upper edge of each cleaning blade is bevelled upwardly and rearwardly to provide a knife edge 190 which scrapes against the forward face of each disc as the discs rotate when the frame is pulled over the ground. The amount of scraping of the cleaning blade may be adjusted by adjusting the angular position of the cleaning blade relative to the forward face of disc 116 by tightening or loosening nut 176.

As shown best in FIGS. 11 and 13, ridge forming machine 96 includes means for pivoting rear frame section 104 relative to front frame section 100 about the horizontal transverse axis through transverse beam 106. A pair of parallel, laterally spaced apart, upright, elongated torsion bars 192 are rigidly secured to the central portion of transverse beam 106. The space between the torsion bars is centered on the horizontal centerline of the frame. A pair of parallel, rearwardly and upwardly extending front mounting brackets 194 are rigidly secured to the upper surface of frame section 100 immediately in front of the apex of the yoke formed by yoke arms 102. The space between mounting brackets 194 is centered on the longitudinal centerline of the frame. An upwardly and rearwardly extending hydraulic cylinder 196 is connected at its bottom between mounting brackets 194 by a pivot pin 198. A piston 199 at the top of the cylinder is connected between the top of torsion bars 192 by a pivot pin 200. Thus, the hydraulic cylinder extends rearwardly along the centerline of the frame and connects the pivotally interconnected front and rear sections 100 and 104.

In use, discs 116 are moved up and down relative to the ground by hydraulic pressure applied to hydraulic cylinder 196 through conventional lines 202. Thus, the discs may be driven deeper into the ground by retracting the piston 199 of hydraulic cylinder 196 to pivot rear frame section 104 counterclockwise (as viewed in FIG. 13) about pivot pins 114. Conversely, the discs may be raised by extending the hydraulic cylinder to rotate rear frame section 104 clockwise (as viewed in FIG. 13).

If front frame section 100 is replaced by a conventional three-point hitch (not shown) which is rigidly mounted on the rear of a tractor (not shown), the rear frame section may be used without depth wheels 134. In this case, the discs may be driven deeper into the ground by extending the piston 199 of hydraulic cylinder 196 to pivot rear frame section 104 clockwise (as viewed in FIG. 13) about the horizontal transverse axis through pivot pins 114. If the hydraulic cylinder is retracted the rear frame section pivots counterclockwise (as viewed in FIG. 13) and the discs are raised.

When using the ridge forming machine described in FIGS. 11 through 14, the hitch at the front of front frame section 100 is connected to the rear of a tractor or other suitable towing vehicle. The desired spacing between discs 116 is then set by adjusting the position of each disc and depth wheel unit relative to its corresponding support beam 108. If the discs are moved rearwardly to widen the spacing between them, for example, each locking bolt 152 is threaded in the particular hole 150 in the supporting beam which marks the desired location of the disc and depth wheel unit. The bolt is threaded through one side only of the support beam so each disc and depth wheel unit may move relative to the support beam. The tractor is then moved forward to permit each disc and depth wheel unit to slide rearwardly along its support beam until the mounting plate 124 of each slide bar engages the head of the bolt 152 which acts as a stop to prevent further rearward movement of the disc and depth wheel unit. The discs also may be moved forward or rearward manually, but they are both relatively heavy, and it has been found easier to move the tractor when positioning the discs. When the discs are in their desired position, each bolt 152 is threaded through the matching hole in the slide bar and the hole in the inner side of the support beam to rigidly secure each disc and depth wheel unit to the support beams.

The penetration of the discs into the ground is then adjusted by applying hydraulic pressure to the hydraulic cylinder 196 to pivot rear frame section 104 either clockwise (as viewed in FIG. 13) or counterclockwise (as viewed in FIG. 13) about the horizontal transverse axis through transverse beam 106 to lift the discs or drive them into the ground, respectively. The raising or lowering of the discs also changes the angle of the cut provided by the discs. Thus, the discs may be inclined slightly or raised to an upright position to either increase or decrease, respectively, the amount of suction provided by the teeth 154 and 160 as they engage the ground. Before adjusting the depth of the discs, each bolt 146 is removed so the wheel struts are free to ride up or down between their respective mounting plates 130 and 132 as the depth of the discs is adjusted. After the discs are positioned at their desired elevation, each bolt 146 is replaced in the particular pair of holes 142 and 144 which are aligned with the cooperating hole in the adjacent wheel strut to maintain the depth wheels in a fixed position relative to the frame.

As the ridge forming machine is pulled, the discs turn and cut into the earth so dirt is scraped inwardly. In some cases a second pass is made to scrape inwardly the dirt which was turned up during the first pass. In this case, each disc and depth wheel unit is moved forwardly to shorten the spacing between the discs so the discs will move the dirt turned during the first pass.

Depth wheels 134 alternatively may be connected to support beams 108 separately from the discs so as to move independently of the discs. Moreover, in some applications the depth wheels may be eliminated entirely.

The pivot pins 114 and 200 are removable from their respective brackets so that front frame section 100 may be removed and replaced with a conventional rigid three-point hitch. The ends of transverse beam 106 and the upper end of torsion bar 192 are then connected to the three-point hitch (not shown) which is rigidly mounted on the rear of a tractor (not shown). A conventional turnbuckle (not shown) may be connected between the hitch and the top of the torsion bar to adjust the elevation of the discs. In this form of the ridge forming machine, depth wheels are not necessary because the three-point hitch provides the lift for the rear frame section.

As shown best in FIG. 11, each support beam 108 extends rearwardly and outwardly at an angle of approximately 45° relative to the longitudinal centerline of the frame. This configuration positions each of the rearwardly converging discs so each disc engages the ground at a "flare angle" of about 45° (when viewed in plan view) relative to the direction in which the ridge forming machine is moved over this ground. Generally speaking, the flare angle of the discs produces a more effective penetration of the ground as the discs are moved over the ground, when compared with shallower or steeper flare angles. The configuration of the support beams 108 and the means for mounting the discs 116 on the beams permits the position of each disc to be changed relative to its beam and the spacing between discs to be changed while at the same time maintaining the optimum flare angle of the discs.

Each disc 116 has the advantage of being integrally connected with its own bearing which in turn is slidable back and forth on its own support beam 108. This configuration permits the spacing between discs to be adjusted substantially easier than the prior art ridge forming devices. The configuration of the rear frame section 104 also eliminates the need for a third crossbar connected between the rear ends of the support beams. In some prior art ridge forming devices, for example, such crossbars must be adjusted in length each time the spacing between discs is adjusted. The frame of this invention eliminates this problem.

Moreover, the elongated nature of each bearing spreads the bearing surface of each disc over a substantial length of the support beams to reduce the wear on the support beams. The rearwardly and inwardly converging arrangement of the discs on the respective support beams puts the discs in tension when they engage the ground as the ridge forming device is pulled over the ground. This avoids applying a substantial bending moment on the support beams.

Frame 98 also may be adapted to carry packing wheels (not shown) which rotate about an axis inclined to the ground at the ends of struts (not shown) connected either to transverse beam 106 or to the support beams 108.

Cleaning blades 166 work substantially the same as cleaning blades 87 described above. Cleaning blades 166 prevent accumulation of mud on discs 116 and avoid clogging of an opening between adjacent rear portions of the discs. Any dirt which tends to cling to the forward faces of the discs is scraped off by the cleaning blades and dropped into the open area between the forward portions of the discs. Thus, any dirt which is removed from the discs is immediately scraped inwardly by the discs and avoids the tendency to clog the narrow space between the rear portions of the discs.

FIGS. 15 through 17 show an alternative form of the invention in which a front frame section 204, which preferably is a conventional three-point hitch rigidly mounted on the rear of a tractor, is pivotally interconnected with a rear frame section 206 which carries a single angularly disposed disc 208. Rear frame section 206 includes a horizontally disposed transverse beam 210 and a pair of parallel, laterally spaced apart, upright torsion bars 212 rigidly secured to a central portion of transverse beam 210. The yoke arms of the front frame section 204 are connected to the ends of transverse beam 210 by removable pivot pins 213. The forward end of a hydraulic cylinder (not shown) or a turnbuckle (not shown) is connected to the front frame section, or three-point hitch, and a piston 214 at the rear portion of the cylinder or turnbuckle is connected to the tops of torsion bars 212 in the manner described above for the ridge forming device shown in FIGS. 11 through 14.

A rearwardly extending mounting block 216 is rigidly secured to an edge of transverse beam 210. The front end of an elongated, transversely square and hollow support beam 218 is rigidly secured to mounting block 216. The support beam extends rearwardly and inwardly from the mounting block, preferably at an angle of about 45° (when viewed in plan view) relative to the longitudinal centerline of the frame.

The disc 208 is journalled in an elongated bearing 220 identical to the bearing for each disc 116. Bearing 220 is rigidly secured to support beam 218 by an elongated pin 222 extending through an opening in a halfbolt head 224 welded to a circular rear mounting plate 226 which, in turn, is welded to the exterior of support beam 218. A circular mounting plate 228 rigidly secured to the rear of bearing 220 bears against a thrust bearing 230 mounted on support beam 218 forward of rear mounting plate 226. No depth wheels are used in the device shown in FIGS. 15 through 17. They are not necessary because the three-point hitch 204 provides the lift for the rear frame section 206.

An elongated cleaning blade 232 is held against the forward face of disc 208 by an elongated cleaning blade arm 234 which is rigidly secured to support beam 218.

In use, the support beam holds a disc at the most effective flare angle relative to the ground, and the disc is positioned on the support beam at a point which permits the disc to engage the ground at a point lying substantially on the longitudinal centerline of the frame. The machine may be used as a ditch forming device by pivoting the rear frame section downwardly to increase the penetration of the disc into the ground. Thereafter, as the machine is pulled over the ground by a tractor, the disc rotates to turn up dirt and move it to the side to form an elongated ditch along the path on which the machine is pulled. The side draft produced by the machine as the disc penetrates the ground is taken up by the tractor. The machine also may be used to knock down ridges or levees by pivoting the rear frame section upwardly to decrease the penetration of the disc into the ground so the disc may be held in a fixed position which permits it to engage a ridge of levee present in the path over which the machine is pulled.

I claim:
1. A ridge forming machine including
   a. a frame having a longitudinal axis, the frame being adapted to be moved over the ground, and including a front frame section adapted for connection to a towing vehicle, and a rear frame section pivotally interconnected with the front frame section, the rear frame section including laterally spaced apart, elongated right and left beams extending rearwardly away from the front frame section, the beams being in substantially the same plane and each being disposed at an angle relative to the longitudinal axis of the frame,
   b. elongated right and left slide bar sleeves fitted around the right and left beams, respectively, each sleeve being slidable lengthwise on its respective beam,
   c. a rotatable right disc carried centrally by the right slide bar sleeve, the right disc being rotatable relative to the right slide bar sleeve about a central axis through the sleeve and the right beam to cut into the ground and scrape dirt as the frame is moved over the ground, the right disc also being slidable with the right slide bar sleeve along the length of the right beam,
   d. a rotatable left disc carried centrally by the left slide bar sleeve, the left disc being rotatable relative to the left slide bar sleeve about a central axis through the sleeve and the left beam to cut into the ground and scrape dirt as the frame is moved over the ground, the left disc also being slidable with the left slide bar sleeve and independently of the right disc along the length of the left beam to independently adjust the spacing between the discs, e. stop means cooperating between each slide bar sleeve and its corresponding beam to releasably hold each slide bar sleeve and disc combination in a fixed position on their respective beams, f. means connected to the frame to support it above the ground during movement of the towing vehicle; and g. means connected between the front and rear frame sections to pivot the rear frame section relative to the front frame section to move the discs up and down relative to the ground.

2. Apparatus according to claim 1 in which the support means comprises right and left depth wheels mounted on the right and left beams, respectively, to support the discs above the ground and limit their penetration into the ground, means for moving each depth wheel up and down with respect to the frame, and means releasably maintaining each depth wheel in a fixed position relative to the frame.

3. Apparatus according to claim 2 including right and left elongated wheel support arms carried on the right and left slide bar sleeves, respectively, the right and left depth wheels being mounted on the right and left wheel support arms, respectively.

4. Apparatus according to claim 3 including right and left wheel support brackets rigidly secured to the right and left slide bar sleeves, respectively, the right and left wheel support arms being mounted to pivot toward and away from the ground adjacent the right and left brackets, respectively, and means releasably securing the right and left wheel support arms to the right and left wheel support brackets, respectively, each wheel support bracket including means to adjust the point of attachment between it and its corresponding wheel support arm for moving the depth wheels up and down relative to the frame.

5. Apparatus according to claim 1 in which the right and left beams diverge from each other in a direction away from the front frame section so that the right disc scrapes dirt from right to left as the frame moves over the ground, and the left disc scrapes dirt from left to right as the frame moves over the ground.

6. Apparatus according to claim 5 in which each beam diverges at an angle of about 45° relative to the longitudinal axis of the frame.

7. Apparatus according to claim 1 including spaced apart teeth on the outer periphery of each disc for improving the cutting power and penetration of the discs into the ground.

8. Apparatus according to claim 7 including means removably securing the teeth to the discs.

9. Apparatus according to claim 1 in which the means for pivoting the frame sections includes an elongated torsion bar having one end rigidly secured to the rear frame section, and a hydraulic ram extending between the front frame section and a point on the torsion bar spaced from its connection with the rear frame section, whereby the ram extends and retracts to pivot the rear frame section relative to the front frame section.

10. Apparatus according to claim 1 including a separate cleaning blade disposed adjacent the forward portion of the forward face of each disc.

11. Apparatus according to claim 10 including means urging each cleaning blade against its respective disc.

12. Apparatus according to claim 1 in which the stop means comprises a longitudinally spaced apart series of holes in each beam, and a separate stop carried on each beam and adapted to be releasably engaged with each of the holes therein, each stop being so positioned on its respective beam that the slide bar sleeve on the beam is slidable into or out of contact with the stop.

13. A ridge forming machine including a. a frame adapted to be moved over the ground and including a front frame section adapted for connection to a towing vehicle, and a rear frame section pivotally interconnected with the front frame section, the rear frame section including laterally spaced apart, elongated right and left beams diverging from each other away from the front frame section, b. elongated right and left slide bar sleeves fitted around the right and left beams, respectively, each sleeve being slidable lengthwise on its respective beam;

c. a rotatable right disc carried centrally by the right slide bar sleeve, the right disc being rotatable relative to the right slide bar sleeve about a central axis through the sleeve and the right beam to cut into the ground and scrape dirt from right to left as the frame is moved over the ground, the right disc also being slidable with the right slide bar sleeve along the length of the right beam, d. a rotatable left disc carried centrally on the left slide bar sleeve, the left disc being rotatable relative to the left slide bar sleeve about a central axis through the sleeve and the left beam to cut into the ground and scrape dirt from left to right as the frame is moved over the ground, the left disc also being slidable with the left slide bar sleeve and independently of the right disc along the length of the left beam to independently adjust the spacing between the discs, e. stop means cooperating between each slide bar sleeve and its corresponding beam to releasably hold each slide bar sleeve and disc combination in a fixed position on their respective beams, f. means for supporting the frame above the ground during movement of the towing vehicle, the support means including right and left elongated wheel support arms carried by the right and left slide bar sleeves, respectively, right and left depth wheels on the right and left wheel support arms, respectively, means for moving each wheel support arm up and down relative to its respective beam, and means releasably maintaining each wheel support arm in a fixed position relative to the beam, and g. means connected between the front and rear frame sections to pivot the rear frame section relative to the front frame section to move the discs up and down relative to the ground.

14. Apparatus according to claim 13 including right and left wheel support brackets rigidly secured to the right and left slide bar sleeves, respectively, the right and left wheel support arms being mounted to pivot toward and away from the ground adjacent the right and left brackets, respectively, and means releasably securing the right and left wheel support arms to the right and left wheel support brackets, respectively, each wheel support bracket including means to adjust the point of attachment between it and its corresponding wheel support arm for moving the depth wheels up and down relative to the rear frame section.

15. Apparatus according to claim 14 in which the means for pivoting the frame sections includes an elongated torsion bar having one end rigidly secured to the rear frame section, and a hydraulic ram extending between the front frame section and a point on the torsion bar spaced from its connection with the rear frame section, whereby the ram extends and retracts to pivot the rear frame section relative to the front section.

* * * * *

PO-1050
(5/69)

UNITED STATES PATENT OFFICE
CERTIFICATE OF CORRECTION

Patent No. 3,760,885   Dated September 25, 1973

Inventor(s) ROSS B. McKENZIE

It is certified that error appears in the above-identified patent and that said Letters Patent are hereby corrected as shown below:

[76] "Elveria" should read --Elverta--.

Col. 6, line 40, "extending" should read --extend--.

Col. 9, line 23, "top" should read --tops--.

Signed and sealed this 26th day of February 1974.

(SEAL)
Attest:

EDWARD M. FLETCHER, JR.        C. MARSHALL DANN
Attesting Officer              Commissioner of Patents